(12) United States Patent
Yamada et al.

(10) Patent No.: US 7,976,812 B2
(45) Date of Patent: Jul. 12, 2011

(54) METHOD FOR PRODUCING NON-POROUS CORE-POROUS SHELL SILICA

(75) Inventors: Kenji Yamada, Chiyoda-ku (JP); Kazuhiko Yamada, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/250,745

(22) Filed: Oct. 14, 2008

(65) Prior Publication Data

US 2009/0053524 A1    Feb. 26, 2009

Related U.S. Application Data (63) Continuation of application No. PCT/JP2007/055442, filed on Mar. 16, 2007.

(30) Foreign Application Priority Data

Apr. 20, 2006 (JP) ................. 2006-116595

(51) Int. Cl.
*C01B 33/113* (2006.01)
*C01B 33/141* (2006.01)
*B05D 7/00* (2006.01)
*B32B 5/16* (2006.01)

(52) U.S. Cl. ......... 423/335; 427/215; 428/403; 428/404

(58) Field of Classification Search .................. 428/403, 428/404; 423/335
See application file for complete search history.

(56) References Cited

U.S. PATENT DOCUMENTS

| 2,883,347 | A | * | 4/1959 | Fisher et al. | 252/502 |
|---|---|---|---|---|---|
| 4,010,242 | A | * | 3/1977 | Iler et al. | 423/335 |
| 4,070,283 | A | | 1/1978 | Kirkland | |
| 4,131,542 | A | * | 12/1978 | Bergna et al. | 210/656 |
| 4,600,646 | A | * | 7/1986 | Stout | 428/405 |
| 4,770,286 | A | * | 9/1988 | Opperthauser | 198/476.1 |
| 5,342,876 | A | * | 8/1994 | Abe et al. | 524/493 |

(Continued)

FOREIGN PATENT DOCUMENTS

JP    53-71699    6/1978

(Continued)

OTHER PUBLICATIONS

Buchel et al, A Novel Pathway for Synthesis of Submicrometer-Size Solid Core/Mesoporous Shell Silica Spheres, Adv. Mater. (1998), 10, No. 13, 1036-1038.*

(Continued)

*Primary Examiner* — Hoa Le
(74) *Attorney, Agent, or Firm* — Oblon, Spivak, McClelland, Maier & Neustadt, L.L.P.

(57) ABSTRACT

A core-shell silica having a high sphericity and a narrow particle distribution and a method for easily producing the core-shell silica which includes dispersing substantially non-porous silica core particles having a sphericity of at least 0.8 and a coefficient of variation of at most 0.2 in a dispersion medium containing an alcohol and water in the presence of a surfactant to prepare a dispersion; adding a silica material to the dispersion and reacting the silica material under a condition of pH of from 8 to 13 to form a shell precursor containing silica and the surfactant on the surface of each silica core particle; and removing the surfactant from the shell precursor to form a porous shell.

4 Claims, 4 Drawing Sheets

U.S. PATENT DOCUMENTS

| | | | | |
|---|---|---|---|---|
| 6,132,773 | A | * | 10/2000 | Amiche ........................ 424/490 |
| 6,159,277 | A | * | 12/2000 | Tanaka et al. ................. 106/272 |
| 6,991,852 | B2 | * | 1/2006 | Carr et al. ..................... 428/447 |

FOREIGN PATENT DOCUMENTS

| | | |
|---|---|---|
| JP | 3-139537 | 6/1991 |
| JP | 11-60231 | 3/1999 |
| JP | 2002-275389 | 9/2002 |
| JP | 3500305 | 12/2003 |

OTHER PUBLICATIONS

The protest letter under 37 CFR 291, faxed Nov. 1, 2010.*

Kim et al, Synthesis and characterization of spherical carbon and polymer capsules with hollow macroporous core and mesoporous shell structures, Microporous and Mesoporous Materials 63 (2003) 1-9.*

Yano & Nakamura, Synthesis of Highly Monodispersed Core/Shell Mesoporous Silica Spheres, Chemistry Lett. vol. 35, No. 9 (2006) 1014-1015.*

Ogawa et al, Preparation of transparent mesoporous silica films by a rapid solvent evaporation method, J. Mater. Chem., 8(8), 1784-1786 (1998).*

Kosmulski & Matijevic, zeta-Potentials of Silica in Water-Alcohol Mixtures, Langmuir 1992, 8, 1060-1064.*

Suk Bon Yoon, et al., "Synthesis of monodisperse spherical silica particles with solid core and mesoporous shell: mesopore channels perpendicular to the surface", Journal of Materials Chemistry, vol. 17, XP-002587340, Feb. 20, 2007, pp. 1758-1761.

Letter from The Law Office of Daniel V. Thompson, P.C. dated Mar. 24, 2011.

G. Buechel, et al., "Tailored Syntheses of Nanostructured Silicas: Control of Particle Morphology, Particle Size and Pore Size", Supramolecular Science, vol. 5, Nos. 3-4, 1998, pp. 253-259.

Calculated pH for Kim as described in M. Kim et al., Microporous and Mesoporous Materials, 63, 2003, 1-9.

Calculated pH for Buchel as described in G. Buchel et al., Adv. Mater., 1998, No. 13, 1036-1038.

* cited by examiner

METHOD FOR PRODUCING NON-POROUS CORE-POROUS SHELL SILICA

TECHNICAL FIELD

The present invention relates to a core-shell silica and a method for producing it.

BACKGROUND ART

Porous silica is used as a filler for liquid chromatography, a shape selective catalyst, adsorption/separation material for various ions, a flatting agent for paints, etc. In a case where the porous silica is used as a filler for liquid chromatography, the porous silica is required to have a low liquid supply resistance and a high separation efficiency.

The liquid supply resistance can be reduced by increasing the particle size of a porous silica. However, if the particle size of the porous silica is increased, it takes time until substances to be separated are absorbed by the porous silica, then reach a central part of the porous silica and then are released from the porous silica, whereby the separation efficiency deteriorates. On the other hand, if the particle size of the porous silica is decreased in order to improve the separation efficiency, the liquid supply resistance becomes high.

In order to satisfy both low liquid supply resistance (pressure loss suppression) and high separation efficiency, it is conceivable to use a core-shell silica wherein a surface of non-porous silica particle is covered with a shell made of porous silica. The core-shell silica has the non-porous silica core particle at the central part, whereby substances to be separated which is adsorbed on the core-shell silica remain on the shell in the vicinity of the surface. Accordingly, the time until the substances to be separated are adsorbed and then released, is short, and the separation efficiency is high. Further, if the silica-core particle is made to be large, while the thickness of the shell is maintained to be thin, the particle size of the core-shell silica can be large, whereby without decreasing the separation efficiency, the liquid supply resistance can be low.

As the core-shell silica, a core-shell silica obtained by the following method has been known:

A method which comprises a step of neutralizing an alkali silicate aqueous solution and a mineral acid aqueous solution at a pH of from 2 to 10 to produce a gel method amorphous silica, a step of wet pulverizing the gel method amorphous silica, and a step of neutralizing an alkali silicate aqueous solution and a mineral acid aqueous solution at a pH of from 5 to 9 in the presence of the wet pulverized gel method amorphous silica to precipitate sedimentation method amorphous silica particles on the surface of the gel method amorphous silica particles (Patent Document 1).

However, the wet pulverized gel method amorphous silica particles are not spherical but non-specific form particles, and the particle size distribution is broad. Accordingly, the core-shell silica obtained by precipitating sedimentation method amorphous silica particles on the surface of the gel method amorphous silica particles has a low sphericity and a broad particle size distribution. Further, there is a problem that if such a core-shell silica is used as a packing material for liquid chromatography, its packing property to a column for liquid chromatography is poor due to low sphericity.

Further, in the porous shell formed by precipitating sedimentation method amorphous silica particles on the surface of the gel method amorphous silica particles, the uniformity in thickness is low, and if it is used as a packing material for liquid chromatography, there is a problem of low separation efficiency.

PATENT DOCUMENT 1: JP3500305

DISCLOSURE OF THE INVENTION

Objects to be Accomplished by the Invention

The present invention is to provide a core-shell silica having a high sphericity and a narrow particle size distribution, and a method for easily producing the core-shell silica.

Means to Accomplish the Object

The present invention provides the followings:
(1) A method for producing a core-shell silica, which comprises a step of dispersing substantially non-porous silica core particles having a sphericity of at least 0.8 and a coefficient of variation of at most 0.2 in a dispersion medium containing an alcohol and water in the presence of a surfactant to prepare a dispersion; a step of adding a silica material to the dispersion and reacting the silica material under a condition of pH of from 8 to 13 to form a shell precursor containing silica and the surfactant on the surface of each silica core particle; and a step of removing the surfactant from the shell precursor to form a porous shell.
(2) The method for producing a core-shell silica according to the above (1), wherein the concentration of the silica core particles in the dispersion is from 20 to 500 $m^2/L$ as calculated by the surface area.
(3) The method for producing a core-shell silica according to the above (1), wherein the alcohol is at least one selected from the group consisting of methanol, ethanol, isopropanol, n-propanol, ethylene glycol and glycerol.
(4) The method for producing a core-shell silica according to the above (1), wherein the surfactant is an alkylammonium halide or an alkylamine.
(5) The method for producing a core-shell silica according to the above (1), wherein the silica material is an alkoxysilane, sodium silicate or a mixture thereof.
(6) A core-shell silica, which comprises substantially non-porous silica core particles having a sphericity of at least 0.8 and a coefficient of variation of at most 0.2 and a porous shell covering each silica core particle, wherein the sphericity of the core-shell silica is at least 0.8, and the coefficient of variation of the core-shell silica is at most 0.2.
(7) The core-shell silica according to the above (6), wherein the shell has an average pore size of from 2 to 50 nm, a pore volume of from 0.05 to 2 mL/g and a specific surface area of from 50 to 1,000 $m^2/g$.
(8) The core-shell silica according to the above (6) or (7), wherein the thickness of the shell is from 0.1 to 10 μm.
(9) A filler for liquid chromatography which employs the core-shell silica as defined in any one of the above (6) to (8).

Effect of the Invention

The core-shell silica of the present invention has a high sphericity and a narrow particle size distribution.

According to the method of the present invention for producing a core-shell silica, a core-shell silica having a high sphericity and a narrow particle size distribution can be easily produced.

BEST MODE FOR CARRYING OUT THE INVENTION

Method for Producing the Core Shell Silica

The method of the present invention for producing the core-shell silica comprises the following steps:

(a) A step of dispersing substantially non-porous silica core particles in a dispersion medium containing an alcohol and water in the presence of a surfactant to prepare a dispersion.

(b) A step of adding a silica material to the dispersion and reacting the silica material under a condition of pH of from 8 to 13 to form a shell precursor containing silica and the surfactant on the surface of each silica core particle.

(c) A step of removing the surfactant from the shell precursor to form a porous shell.

Step a

A dispersion is prepared by dispersing silica core particles in a dispersion medium containing an alcohol and water.

The silica core particles are substantially non-porous silica having a sphericity of at least 0.8 and a coefficient of variation of at most 0.2.

Substantially non-porous means that the specific surface area of the silica core particles measured by a nitrogen gas adsorption method is at most 50 m²/g. If the specific surface area of the silica core particles is at most 50 m²/g, when the core-shell silica is used as a packing material for liquid chromatography, substances to be separated which are adsorbed by the shell will not be adsorbed by the silica core particles, and the separation efficiency becomes high. The specific surface area of the silica core particles is preferably at most 30 m²/g.

The sphericity of the silica core particles is at least 0.8, preferably at least 0.9. If the sphericity of the silica core particles is at least 0.8, a core-shell silica having a sphericity of at least 0.8 can be obtained.

The sphericity is a value obtained by measuring silica core particles by a scanning electron microscope (SEM), by selecting 100 particles at random, measuring the major axis and the minor axis of each silica core particle to obtain a sphericity (minor axis/major axis) and calculating an average of the sphericity of 100 silica core particles.

The coefficient of variation of the silica core particles is at most 0.2, preferably at most 0.15. If the coefficient of variation of the silica core particles is at most 0.2, the coefficient of variation of the core-shell silica is at most 0.2, namely, a core-shell silica having a narrow particle distribution can be obtained.

The coefficient of variation can be obtained by the following method.

The standard deviation of a particle size distribution and the number average particle size are obtained by observing silica core particles by a scanning electron microscope (SEM), by selecting 100 particles at random, and measuring the particle size of each silica core particle, and the coefficient of variation is obtained by the following formula.

$$\text{Coefficient of variation} = \text{standard deviation} / \text{number average particle size}$$

The number average particle size of the silica core particles is preferably from 1 to 100 µm, more preferably from 0.3 to 50 µm. If the number average particle size of the silica core particles is at least 0.1 µm, a shell having a thickness of at least 0.1 µm can be easily formed. Further, a core-shell silica having a large particle size can be obtained. If the number average particle size of the silica core particles is at most 100 µm, a porous silica having a substantially effective pore volume to silica core particles can be formed.

The number average particle size of the silica core particles is a value obtained by measuring silica core particles by a scanning electron microscope (SEM), by selecting 100 particles at random, measuring the particle size of each silica core particle and calculating an average of the particle sizes of 100 silica core particles.

From the viewpoint of having the above properties, the silica core particles are preferably a silica produced by a sol-gel reaction of a metal silicon alkoxide as a starting material, and a silica produced by stober method is particularly preferred.

Figure 1:
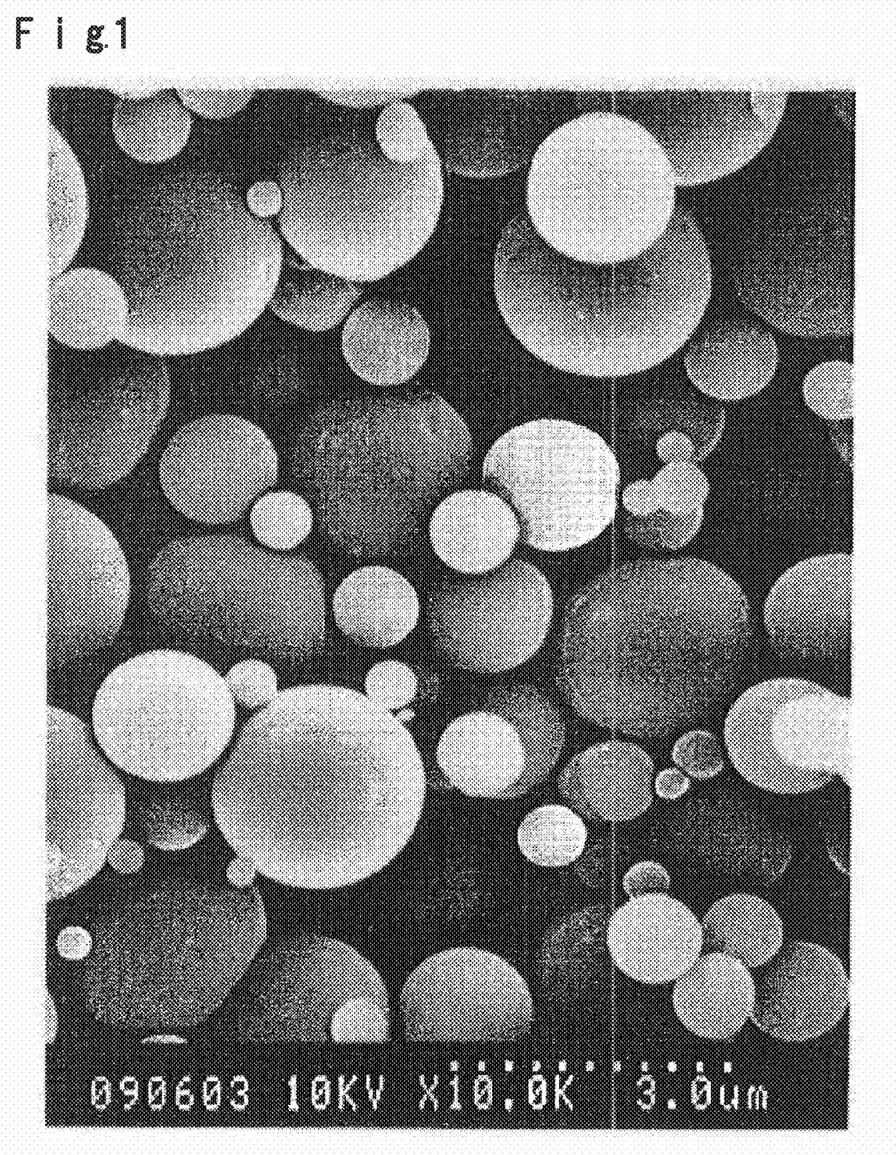
FIG. 1 is a SEM photograph of a core-shell silica in a case where a shell is formed under a condition that the concentration of the silica core particles (calculated by the surface area) is low.

The concentration of the silica core particles in 1 L of a dispersion is preferably from 20 to 500 m²/L, more preferably from 30 to 300 m²/L as calculated by the surface area. If the concentration of the silica core particles is at least 20 m²/L (calculated by the surface area), in a case where a silica material is reacted at a pH of from 8 to 13, almost all amount of the silica material is consumed to form a shell, whereby production of new porous silica particles can be suppressed. Namely, if the concentration of the silica core particles (calculated by the surface area) is too low, fine porous silica particles may sometimes be formed, as shown in the SEM photograph of FIG. 1. If the concentration of the silica core particles (calculated by the surface area) is preferably at most 500 m²/L, a porous silica can be formed on a surface of the silica core particles efficiently.

For example, in a case where a silica core particle having a specific surface area of 3.5 m²/g is used, a mass concentration of the silica core particle is from 20/3.5=5.71 g/L to 500/3.5=142.9 g/L so that the concentration of the silica core particles (calculated by the surface area) becomes 20 to 500 m²/L.

The alcohol is at least one selected from the group consisting of methanol, ethanol, isopropanol, n-propanol, ethylene glycol and glycerol. From the viewpoint of solubility of a silica material, methanol or ethanol is preferred.

The concentration of the alcohol is preferably from 20 to 90 mass %, more preferably from 30 to 85 mass %, based on the total 100 mass % of an alcohol and water. In a case where an alkoxysilane is used as a silica material for producing a porous silica, if the concentration of the alcohol is at least 20 mass %, the rate of hydrolysis of the alkoxysilane can be appropriately controlled, and a porous silica can be uniformly formed on the surface of the silica core particle. Further, if the concentration of the alcohol exceeds 90 mass %, hydrolysis of the alkoxysilane is slow, and it is impossible to form a porous silica efficiently.

The surfactant has a role as a template for forming pores in a shell. The type and concentration of the surfactant substantially influence on the shape of pores of the shell. One type of the surfactant may be used alone, or two or more types may be used in combination. In order to form a shell having uniform pores, it is preferred to use one type of the surfactant.

The surfactant may, for example, be a surfactant which has a role as a template for forming pores in a shell, and an alkylammonium halide or an alkylamine is preferred.

The alkylammonium halide may, for example, be a tetradecyl trimethylammonium halide, a hexadecyl trimethylammonium halide, an octadecyl trimethylammonium halide, an eicosyl trimethylammonium halide or a docosyl trimethylammonium halide.

The alkylamine may, for example, be a $C_{8-20}$ linear alkylamine, and from the viewpoint of forming uniform pores, dodecyl amine is preferred.

In a case where an alkylammonium halide or an alkylamine is used as a surfactant, the concentration of the surfactant is preferably from 0.001 to 0.2 mol/L, more preferably from 0.01 to 0.1 mol/L, per 1 L of the dispersion. If the concentration of the surfactant is at least 0.001 mol/L, the effect as a template can be sufficiently obtained. If the concentration of the surfactant is at most 0.2 mol/L, uniform pores can be formed.

Step b

If the silica material is reacted under a condition of a pH of from 8 to 13, silica having an almost uniform thickness precipitates on the surface of silica core particles. At this time, micelle of the surfactant is incorporated into the inside of the silica, whereby a shell precursor containing the silica and the surfactant can be formed.

As the silica material, any material can be used so long as it can form silicon oxide by reaction, and from the viewpoint of reaction efficiency and handling efficiency, an alkoxy silane, sodium silicate or a mixture thereof is preferred, and the alkoxy silane is more preferred.

As the alkoxy silane, from the viewpoint of universality, trimethyl methoxysilane, trimethylethoxy silane, tetraethoxy silane or tetra methoxy silane is particularly preferred.

The concentration of the silica material is preferably from 0.001 to 0.5 mol/L, more preferably from 0.005 to 0.3 mol/L, per 1 L of the total reaction solution containing the dispersion and the silica material. If the concentration of the silica material is at least 0.001 mol/L, silica core particle can be sufficiently covered with the silica precursor. If the concentration of the silica material is at most 0.5 mol/L, almost all amount of the silica material is consumed to form a shell, whereby production of new porous silica particles can be suppressed.

The reaction of the silica material is carried out at a pH of from 8 to 13 from initiation to termination of the reaction. If the pH is lower than 8, the rate of hydrolysis of the alkoxy silane is slow. If the pH exceeds 13, it is impossible to control the rate of hydrolysis. The pH is more preferably from 9 to 12.5.

As a method to adjust the pH of a reaction solution containing the dispersion and the silica material to 8 to 13, a method of adding a basic compound, or a method of using a basic surfactant such as an alkyl amine may be mentioned.

The reaction temperature of the silica material is preferably from 10 to 50° C., and the reaction time is preferably from 1 to 24 hours.

Step c

The method for removing the surfactant from the shell precursor may, for example, be (i) a method wherein particles having a shell precursor formed on silica core particles (hereinafter referred to as core-shell silica precursor) are added in a solvent in which a surfactant is dissolved, and the surfactant thereby contained in the shell precursor is eluted or (ii) a method wherein a core-shell silica precursor is fired to burn off the surfactant contained on the shell precursor. Since the surfactant can be completely removed, the method employing (i) and (ii) in combination is preferred.

The firing temperature is preferably from 400 to 600° C., and the firing time is preferably from 1 to 10 hours.

Core-Shell Silica

The core-shell silica thus obtained has a sphericity of at least 0.8 and a coefficient of variation of at most 0.2.

The sphericity of the core-shell silica is at least 0.8, preferably 0.9. If the core shell-silica has a sphericity of at least 0.8, since the sphericity is high, it has an advantage of an excellent packing property to a column for liquid chromatography.

The sphericity can be obtained in the same manner as in the case of the sphericity of the silica core particles.

The coefficient of variation of the core-shell silica is at most 0.2, preferably at most 0.15. If the coefficient of variation of the core-shell silica is at most 0.2, since the sphericity is high, a packing property to a column for liquid chromatography is excellent, and since uniformity is high, the separation efficiency is high.

The coefficient of variation can be obtained in the same manner as in the case of the coefficient of variation of the silica core particles.

The number average particle size of the core-shell silica is preferably from 0.2 to 110 μm, more preferably from 1 to 90 μm. If the number average particle size of the core-shell silica is at least 0.2 μm, it is possible to form a porous shell on the surface of silica core particles. If the number average particle size of the core-shell silica is at most 110 μm, the core-shell silica can be appropriately used as a packing material for liquid chromatography.

The number average particle size can be obtained in the same manner as in the case of the number average particle size of the silica core particles.

The shell is a porous silica.

The porous means that physical values of pores of the core shell silica measured by a nitrogen gas adsorption method are within the following ranges, in a case where it is assumed that silica core particles do not exist (0 $m^2/g$).

Average pore size: 2 to 50 nm
Pore volume: 0.05 to 2 mL/g
Specific surface area: 50 to 1,000 $m^2/g$ If the average pore size of the shell is at least 2 nm, in a case where it is substantially used as a packing material for liquid chromatography, the shell works as an adsorbing layer. If the average pore size of the shell is at most 50 nm, it can be used for separating a large molecule such as a protein.

If the pore volume of the shell is at least 0.05 mL/g, the shell can work substantially as a porous layer. If the pore volume of the cell is at most 2 mL/g, pores of the shell layer can have an appropriate size, and the porosity of the shell layer can have an appropriate value, whereby the strength of the shell layer can be maintained.

If the specific surface area of the shell is at least 50 $m^2/g$, the shell can work substantially as a porous layer. If the specific surface area of the shell is at most 1,000 $m^2/g$, pores of the shell layer can have an appropriate size, and the porosity of the shell layer can have an appropriate value, whereby the strength of the shell layer can be maintained.

The thickness of the shell is preferably from 0.1 to 10 μm, more preferably from 0.2 to 5 μm. If the thickness of the shell is at least 0.1 μm, the shell can substantially work as a shell layer. If the thickness of the shell is at most 10 μm, the desired separation efficiency can be obtained.

The thickness of the shell can be obtained by the following formula.

Thickness of the shell=(the number average particle size of the core-shell silica−the number average particle size of the silica core particles)/2

Whether a core-shell silica having a substantially uniform shell is obtained or not can be confirmed by variation of the thickness obtained by the following method being at most 0.2. If the variation of the thickness of the shell is at most 0.2, the thickness of the shell layer is substantially uniform, whereby in a case where the core-shell silica is used as a packing material for liquid chromatography, the period of time from substances to be separated are adsorbed to they are released is small, and the separation efficiency is high.

The variation of the thickness of the shell is obtained by observing the cross-section of a core-shell silica by a transmission electron microscope (TEM), and by measuring the maximum thickness of the shell and the minimum thickness of the shell of randomly selected one particle and calculating it by the following formula.

Variation of the thickness=(the maximum thickness of the shell−the minimum thickness of the shell)/the maximum thickness of the shell In the above-described method of the present invention for producing a core-shell silica, silica core particles having a sphericity of at least 0.8 and a coefficient of variation of at most 0.2, namely substantially non-porous silica core particles having a high sphericity and a narrow particle distribution, are used, and a porous shell of which thickness is almost uniform is formed on the surface of each silica core particle by the above steps (a) to (c), whereby a core-shell silica having a sphericity of at least 0.8 and a coefficient of variation of at most 0.2, namely a core-shell silica having a high sphericity and a narrow particle distribution can be formed. Further, without using a specific apparatus, a silica material is added to a dispersion containing silica core particles, the silica material is reacted under a condition of a pH of from 8 to 13 to form a shell precursor, and a surfactant is removed from the shell precursor, whereby a core-shell silica can be easily produced.

EXAMPLES

Now, the present invention will be explained in further detail with reference to Examples. However, the present invention is by no means restricted to such specific Examples.

The pore physical values (specific surface area, average pore size and pore volume) of silica core particles and a core-shell silica were measured by using a pore physical properties-measuring apparatus (AUTOSORB, manufactured by Quantachrome Instruments) by a nitrogen gas adsorption method.

Example 1

Figure 2:
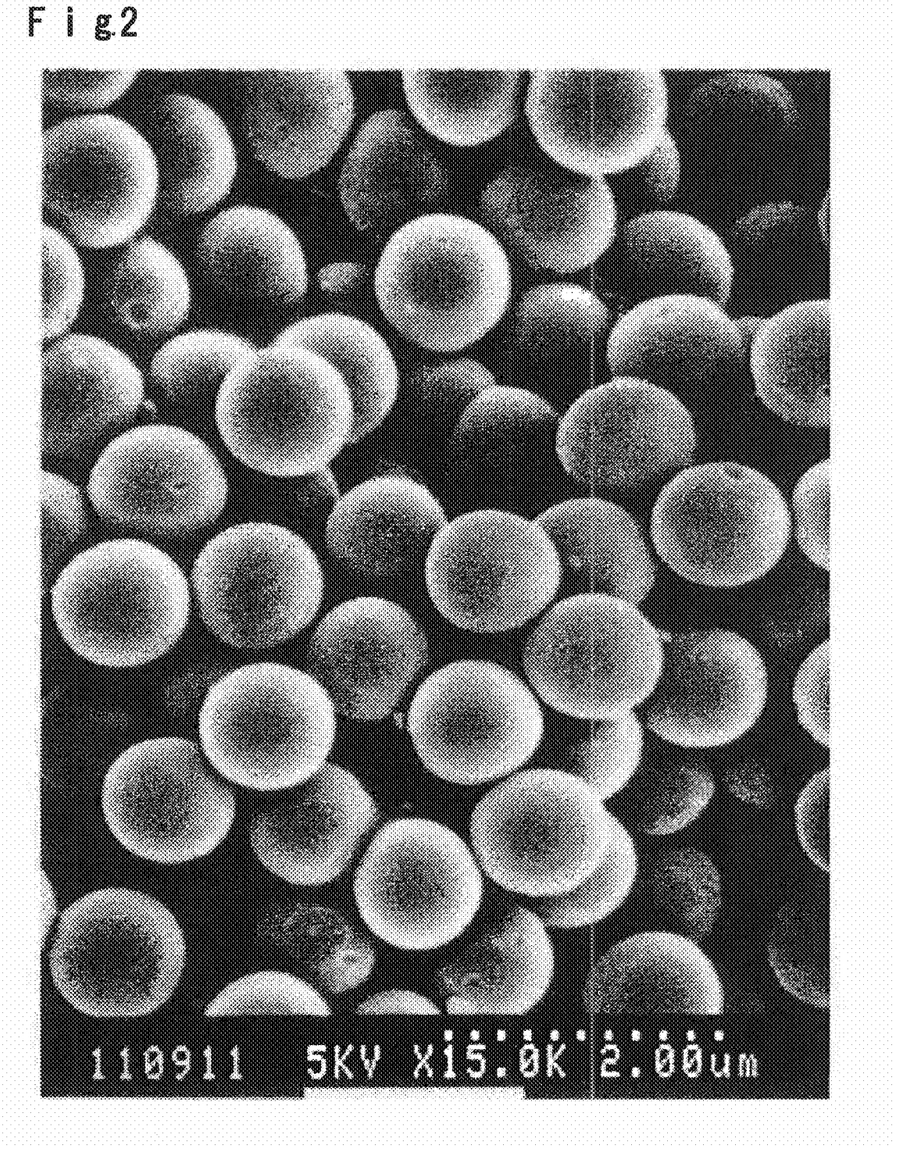
FIG. 2 is a SEM photograph of the silica core particles used in Example 1.

As silica core particles, HPS-1000 (number average particle size: 1.0 μm, specific surface area: 3.5 m$^2$/g, sphericity: 0.95, coefficient of variation: 0.07), manufactured by SHIIMA ELECTRONICS INC. was prepared. FIG. 2 is a SEM photograph of the silica core particles.

4.81 g of the silica core particles, 0.73 g of dodecyl amine as a surfactant, and 28.8 g of distilled water were added in a 100 mL flask with a cover, ethanol was added thereto so that the total volume became 80 mL, and then they were sufficiently mixed to prepare a dispersion. Per 1 L of the dispersion, the concentration of the silica core particles (calculated by surface area) was 210 m$^2$/L, the concentration of the alcohol was 63 mass % in the total 100 mass % of water and the alcohol, and per 1 L of the dispersion, the concentration of the surfactant was 0.05 mol/L.

Then, while stirring the dispersion under a condition of 25° C., 0.17 g of tetraethoxysilane was added to the dispersion. The pH of the reaction solution immediately after the addition of tetraethoxysilane was 9.8. The reaction solution was stirred for 20 hours to hydrolyze tetraethoxysilane, and a shell precursor was formed on the surface of each silica core particle. The concentration of tetraethoxysilane per 1 L of the reaction solution was 0.16 mol/L. The pH of the reaction solution after the stirring for 20 hours was 9.3.

Then, the core-shell silica precursor was recovered by filtrating the reaction solution with a membrane filter having a pore size of 0.1 μm. The core-shell silica precursor was dispersed in 50 mL of ethanol, the dispersion was stirred at 70° C. for one hour, and a part of dodecyl amine was decomposed and removed. The core-shell silica precursor was recovered by filtrating the dispersion with a membrane filter having a pore size of 0.1 μm. The core-shell silica precursor was fired at 550° C. for 3 hours, dodecyl amine was completely removed, and a core-shell silica was obtained.

Figure 3:
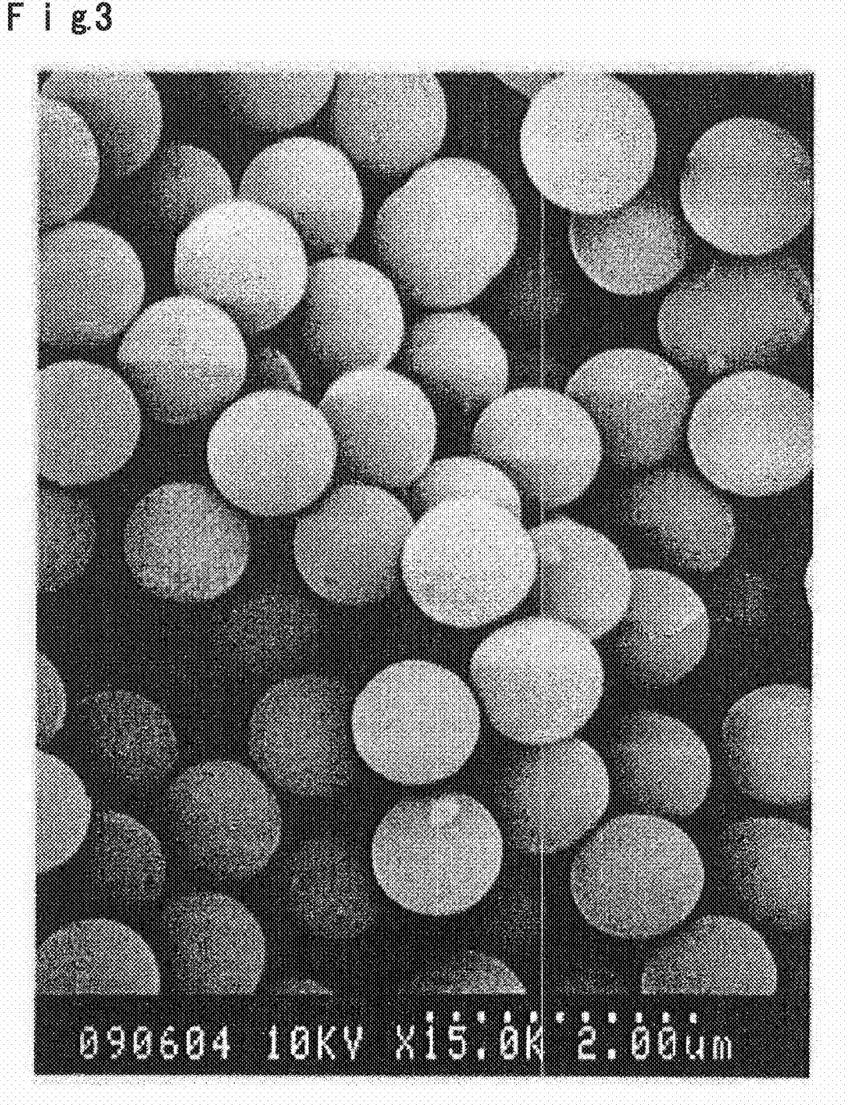
FIG. 3 is a SEM photograph of the core-shell silica obtained in Example 1.
Figure 4:
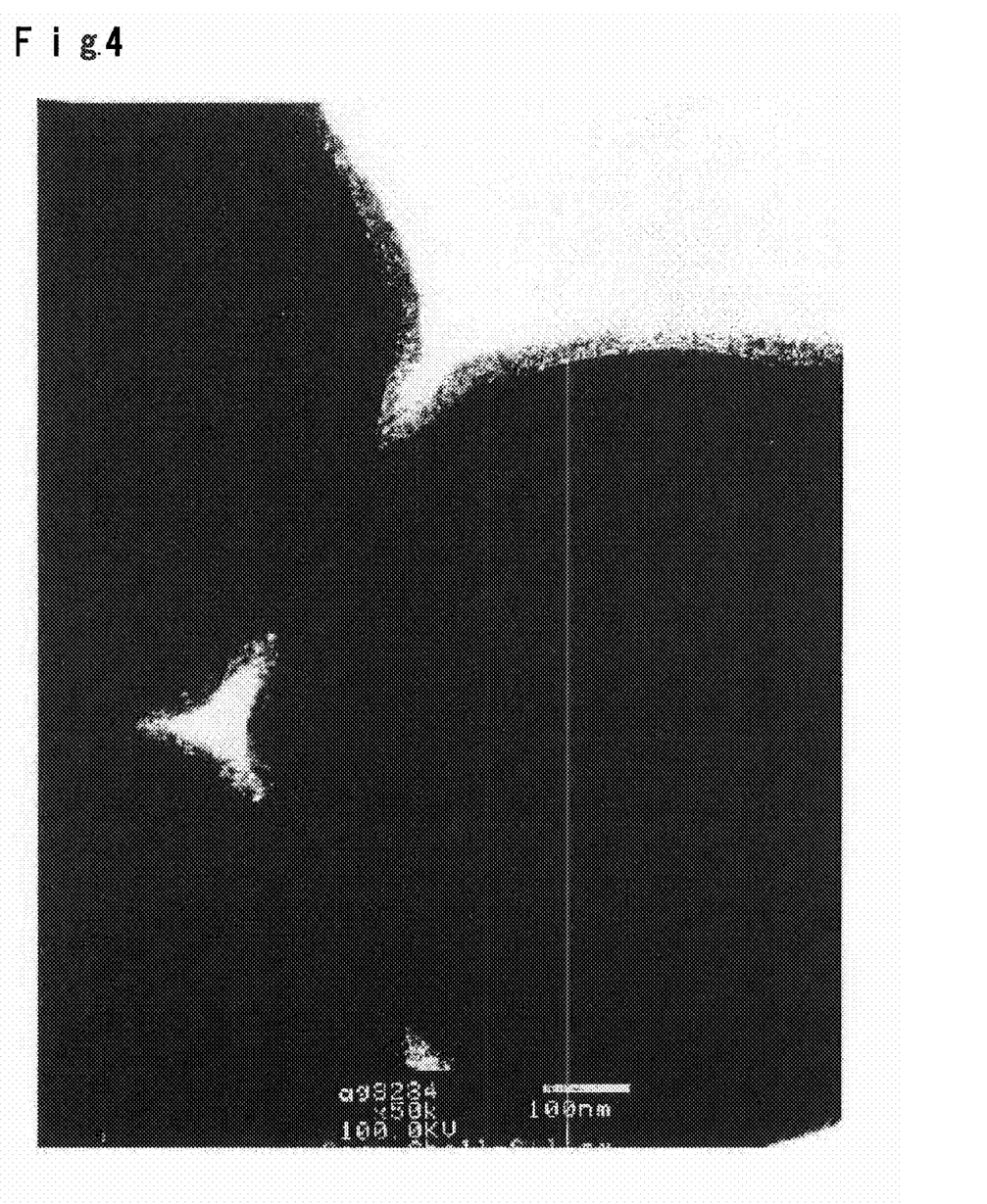
FIG. 4 is a TEM photograph of the cross-section of the core-shell silica obtained in Example 1.

FIG. 3 is a SEM photograph of the obtained core-shell silica, and FIG. 4 is a TEM photograph of the cross-section of the core-shell silica. In FIG. 4, a black part is the core, and a partially transparent part around the core is the shell.

The number average particle size of the core-shell silica (100 particles) was 1.3 μm. Further, the sphericity was 0.92, and the coefficient of variation was 0.10.

With respect to the pore physical properties of the core-shell silica, it was confirmed that the average particle size was 2.5 nm, the specific surface area was 146 m$^2$/g, the pore volume was 0.09 ml/g, and the shell was porous.

The thickness of the shell was 0.15 μm. The variation of the thickness of the shell was substantially 0, and a core-shell having a uniform shell was confirmed.

Example 2

A core-shell silica was produced in the same manner except that 0.5 g of aqueous ammonia was used instead of dodecyl amine. The number average particle size of the obtained core-shell silica was 1.05 μm. The pore physical property values were measured by the nitrogen gas adsorption method, and the shell was substantially non-porous.

INDUSTRIAL APPLICABILITY

The core-shell silica of the present invention is useful as a packing material for liquid chromatography, a shape selective catalyst, a material for adsorbing and separating ions, a flatting agent for paint, etc. Particularly, in a case where the core-shell silica of the present invention is used as a packing material for liquid chromatography, both low liquid supply resistance (pressure loss suppression) and high separation efficiency can be satisfied.

The entire disclosure of Japanese Patent Application No. 2006-116595 filed on Apr. 20, 2006, including specification, claims, drawings and summary is incorporated herein by reference in its entirety.

What is claimed is:

1. A method for producing a core-shell silica, which comprises: dispersing substantially non-porous silica core particles having a sphericity of at least 0.8 and a coefficient of variation of at most 0.2 in a dispersion medium containing an alcohol and water in the presence of a surfactant to prepare a dispersion, wherein the surfactant is an alkylammonium halide or an alkylamine; adding a silica precursor to the dispersion and reacting the silica precursor under a condition of pH of from 8 to 13 to form a shell precursor containing silica and the surfactant on the surface of each silica core particle; and removing the surfactant from the shell precursor to form a porous shell.

2. The method for producing a core-shell silica according to claim 1, wherein the concentration of the silica core particles in the dispersion is from 20 to 500 m²/L as calculated by the surface area.

3. The method for producing a core-shell silica according to claim 1, wherein the alcohol is at least one selected from the group consisting of methanol, ethanol, isopropanol, n-propanol, ethylene glycol and glycerol.

4. The method for producing a core-shell silica according to claim 1, wherein the silica precursor is an alkoxysilane, sodium silicate or a mixture thereof.

* * * * *